Aug. 21, 1934.  R. C. BENNER  1,970,835
ABRASIVE ARTICLE AND METHOD OF MAKING THE SAME
Filed Jan. 31, 1931
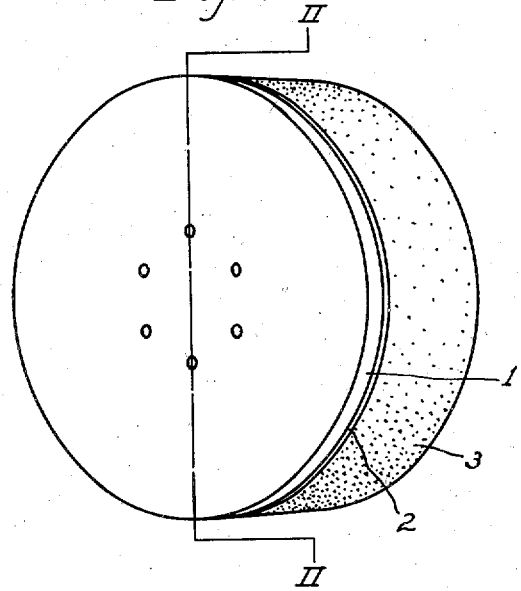
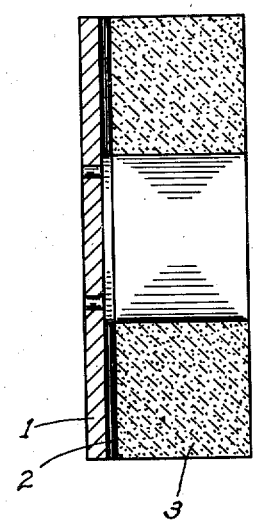
INVENTOR
RAYMOND C. BENNER
BY Thomas C. MacKay
ATTORNEY Patented Aug. 21, 1934

1,970,835

UNITED STATES PATENT OFFICE 1,970,835

ABRASIVE ARTICLE AND METHOD OF MAKING THE SAME

Raymond C. Benner, Niagara Falls, N. Y., assignor to The Carborundum Company, Niagara Falls, N. Y., a corporation of Pennsylvania Application January 31, 1931, Serial No. 512,611
In Canada October 2, 1930

4 Claims. (Cl. 51—209)

This invention relates to new and improved abrasive articles and to a new and improved method of joining abrasive elements to another material. The present specification is a continuation in part of my copending application, Serial No. 466,089, filed July 7, 1930.

It has been desired to secure a resilient bond that adheres to the abrasive granules for attaching bonded abrasives to backing materials such as metals, wood, fibre, cloth or paper, but soft rubber does not adhere to the abrasive material with sufficient tenacity to provide an article even moderately satisfactory.

I have found that this lack of adhesiveness may be obviated and that resilient and flexible abrasive articles that are water-proof can be made by the use of a bonding material containing at least a portion of an isomer of rubber that is less unsaturated chemically than is normally the case with rubber. A bond of this nature is particularly well suited for the purpose of joining bonded abrasive articles to metal backs because it absorbs the shocks incident to the grinding operation and thereby prolongs the life of abrasive articles so used by virtue of its elasticity. It also provides sufficient elasticity to compensate for the different rates of thermal expansion of the bonded abrasive material and the backing metal, whereby the stresses that normally would be set up in the bonded abrasive because of these different rates of expansion are eliminated or at least are reduced to a point where breakage of the bonded abrasive is avoided; thus, instead of the rapidly expanding metal backing pulling the bonded abrasive along with it, as it does when a non-yielding material is used to join the two, it stretches the joint material and little or no pull is exerted upon the bonded abrasive.

I have found too, that the degree of resiliency and flexibility may be controlled over a wide range of values by using isomers of rubber of different degrees of chemical unsaturation, by altering the proportion of isomer of rubber used in connection with other ingredients of the bonding material, or by using materials of different characteristics along with the isomer of rubber.

When a mass of rubber is intimately mixed with organic sulphonyl chlorides, organic sulphonic acids, sulphuric acid or mixtures thereof, or with materials that yield free sulphonic acid when heated in the presence of rubber and then subjected to heat, an exothermic reaction takes place that converts the rubber into a product that has the same carbon and hydrogen ratio as rubber ($C_5H_8$)x but which is chemically less unsaturated than rubber.

The degree of saturation depends to a large extent upon the proportion of reactive material used with the rubber, although it also is influenced by the temperature to which the material is subjected. For example, the resulting isomer of rubber may be 25 per cent to 67 per cent unsaturated as compared with rubber, depending upon the quantity of p-phenol sulfonic acid added to a given quantity of rubber. A tough, balata-like product of approximately 67 per cent unsaturation, as compared with rubber, results when 7½ parts of p-phenol sulfonic acid are mixed with 100 parts of undissolved rubber and heated to 120 degrees to 145 degrees centigrade for 4 to 10 hours. On the other hand, a mixture of 15 parts p-phenol sulfonic acid and 100 parts of undissolved rubber, when heated to 140 degrees centigrade for 8 hours, undergoes an exothermic reaction that raises the temperature of the mass to a temperature of the order of magnitude of 250 degrees centigrade and results in a hard, brittle, shellac-like rubber derivative of approximately 25 per cent unsaturation as compared with rubber. By the use of combinations of the above mentioned products in different proportions, there results a series of products of increasing hardness and decreasing toughness. This series of products gives rise to an unprecedented choice in the material for use in attaching abrasive elements to another material.

Another method by which a modified rubber having characteristics particularly desired for joining a bonded abrasive article to a metal member when the abrasive is to be used in dry grinding comprises the formation of a plastic rubber compound containing a liquid resinous material that is heat hardenable. One way in which such a product may be made comprises working a liquid phenolic condensation resin into rubber and inverting the phases so that the liquid resin is the continuous phase, and the rubber is the dispersed phase. There are various ways of working the liquid resin into the rubber, but it has been found to be expedient to break down the crude rubber in a kneader type of mixer and gradually add the liquid resin while the mixture is being kneaded. A mixture comprising 1 part by weight of crude rubber and 2 parts by weight of a liquid phenolic condensation resin, made in the manner described, has a liquid consistency approximately that of molasses. These mixtures, with or without the addition of sulphur, are hardenable by heat or heat and pressure.

A modification of the above rubber-resin material can be made by forming a dispersion of the resin-rubber in water. Dispersions of this nature can be made from mixtures containing various ratios of rubber to resin.

The methods of making these rubber-resin mixtures or rubber-resin dispersions are described in full detail and claimed in a copending application, Serial No. 548,254, July 1, 1931.

One example of a material that I have found satisfactory for joining abrasive elements to a backing material comprises an intimate mixture of rubber, an isomer of rubber and sulphur in the following approximate proportions.

|  | Parts by weight |
|---|---|
| Rubber isomer | 20 |
| Rubber | 3 |
| Sulphur | 0.9 |

The ratio of rubber isomer to rubber may be decreased to provide greater resiliency.

Another example comprises an intimate mixture of an isomer of rubber and a resinous material (such as a phenolic condensation resin) in the approximate ratio of 10 parts (by weight) of rubber isomer to 15 parts (by weight) of resinous material.

One form of finished article is illustrated by the accompanying drawing in which:

Figure 1 is a perspective view showing a steel back with an abrasive disk mounted thereon; and Figure 2 is a cross-sectional view along the line II—II of Figure 1.

In joining a bonded abrasive element to a supporting member such as a steel plate 1 shown in Figures 1 and 2, I first etch or sand-blast the metal surfaces and then apply a coat 2 of the desired adhesive to the steel 1 and to the bonded abrasive 3. After removing substantially all of the solvent from each of these coatings, I place one coated surface in contact with the other and cure the joint material under a pressure of approximately 50 pounds per square inch and a temperature of 285 degrees Fahrenheit.

While I have used specific examples to illustrate methods of attaching abrasive elements to backing materials, my invention is not limited to such examples but may be practised as defined by the appended claims.

What I claim is:

1. An abrasive article comprising a bonded abrasive article and a metal backing member joined to said bonded abrasive article by an adhesive containing a mixture of rubber, an isomer of rubber and a synthetic resin.

2. An adhesive for joining an abrasive article to a backing member, said adhesive containing a mixture of rubber, an isomer of rubber and a synthetic resin.

3. An abrasive article comprising a bonded abrasive article and a metal backing member joined to the said bonded abrasive article by an adhesive mixture comprising soft rubber and a synthetic resin.

4. An adhesive for joining an abrasive article to a backing member, comprising soft rubber and a synthetic resin.

RAYMOND C. BENNER.

DISCLAIMER 1,970,835.—*Raymond C. Benner*, Niagara Falls, N. Y. ABRASIVE ARTICLE AND METHOD OF MAKING THE SAME. Patent dated August 21, 1934. Disclaimer filed January 15, 1937, by the assignee, *The Carborundum Company*.

Hereby disclaims from claim 4 any adhesive comprising soft rubber and a synthetic resin except as such adhesive is employed for joining a preformed bonded abrasive article to a rigid backing member;

Thereby disclaiming an adhesive *per se* comprising soft rubber and a synthetic resin, and limiting claim 4 to the combination of a preformed bonded abrasive article and a rigid backing member joined to said bonded abrasive article by an adhesive mixture comprising soft rubber and a synthetic resin.

[*Official Gazette February 9, 1937.*]

A modification of the above rubber-resin material can be made by forming a dispersion of the resin-rubber in water. Dispersions of this nature can be made from mixtures containing various ratios of rubber to resin.

The methods of making these rubber-resin mixtures or rubber-resin dispersions are described in full detail and claimed in a copending application, Serial No. 548,254, July 1, 1931.

One example of a material that I have found satisfactory for joining abrasive elements to a backing material comprises an intimate mixture of rubber, an isomer of rubber and sulphur in the following approximate proportions.

|  | Parts by weight |
|---|---|
| Rubber isomer | 20 |
| Rubber | 3 |
| Sulphur | 0.9 |

The ratio of rubber isomer to rubber may be decreased to provide greater resiliency.

Another example comprises an intimate mixture of an isomer of rubber and a resinous material (such as a phenolic condensation resin) in the approximate ratio of 10 parts (by weight) of rubber isomer to 15 parts (by weight) of resinous material.

One form of finished article is illustrated by the accompanying drawing in which:

Figure 1 is a perspective view showing a steel back with an abrasive disk mounted thereon; and Figure 2 is a cross-sectional view along the line II—II of Figure 1.

In joining a bonded abrasive element to a supporting member such as a steel plate 1 shown in Figures 1 and 2, I first etch or sand-blast the metal surfaces and then apply a coat 2 of the desired adhesive to the steel 1 and to the bonded abrasive 3. After removing substantially all of the solvent from each of these coatings, I place one coated surface in contact with the other and cure the joint material under a pressure of approximately 50 pounds per square inch and a temperature of 285 degrees Fahrenheit.

While I have used specific examples to illustrate methods of attaching abrasive elements to backing materials, my invention is not limited to such examples but may be practised as defined by the appended claims.

What I claim is:

1. An abrasive article comprising a bonded abrasive article and a metal backing member joined to said bonded abrasive article by an adhesive containing a mixture of rubber, an isomer of rubber and a synthetic resin.

2. An adhesive for joining an abrasive article to a backing member, said adhesive containing a mixture of rubber, an isomer of rubber and a synthetic resin.

3. An abrasive article comprising a bonded abrasive article and a metal backing member joined to the said bonded abrasive article by an adhesive mixture comprising soft rubber and a synthetic resin.

4. An adhesive for joining an abrasive article to a backing member, comprising soft rubber and a synthetic resin.

RAYMOND C. BENNER.

DISCLAIMER 1,970,835.—*Raymond C. Benner*, Niagara Falls, N. Y. ABRASIVE ARTICLE AND METHOD OF MAKING THE SAME. Patent dated August 21, 1934. Disclaimer filed January 15, 1937, by the assignee, *The Carborundum Company*.

Hereby disclaims from claim 4 any adhesive comprising soft rubber and a synthetic resin except as such adhesive is employed for joining a preformed bonded abrasive article to a rigid backing member;

Thereby disclaiming an adhesive *per se* comprising soft rubber and a synthetic resin, and limiting claim 4 to the combination of a preformed bonded abrasive article and a rigid backing member joined to said bonded abrasive article by an adhesive mixture comprising soft rubber and a synthetic resin.

[*Official Gazette February 9, 1937.*]